United States Patent [19]

McCandless et al.

[11] Patent Number: 5,419,887
[45] Date of Patent: May 30, 1995

[54] SEPARATION OF THE ISOTOPES OF BORON BY CHEMICAL EXCHANGE REACTIONS

[75] Inventors: Frank P. McCandless, Bozeman, Mont.; Ronald S. Herbst, Idaho Falls, Id.

[73] Assignee: Research & Development Institute, Inc., Bozeman, Mont.

[21] Appl. No.: 186,309

[22] Filed: Jan. 25, 1994

[51] Int. Cl.$^6$ ............................................. C01B 35/06
[52] U.S. Cl. ........................................ 423/293; 423/7; 423/8; 423/298; 423/276; 210/151; 210/682; 252/135; 252/517; 204/157.2
[58] Field of Search ............... 423/7, 8, 298, 293, 423/276; 210/151, 682; 252/135, 517; 204/157.2

[56] References Cited

U.S. PATENT DOCUMENTS

| | | | |
|---|---|---|---|
| 3,914,373 | 10/1975 | Jepsen | 423/2 |
| 4,059,670 | 11/1977 | Kakihana et al. | 423/7 |
| 4,371,707 | 2/1983 | Eibeck et al. | 568/6 |
| 4,447,303 | 5/1984 | Jensen et al. | 204/157.1 R |
| 5,176,885 | 1/1993 | Impink, Jr. et al. | 423/6 |
| 5,265,135 | 11/1993 | Impink, Jr. et al. | 376/328 |

OTHER PUBLICATIONS

Palko, A. A., *The Chemical Separation of Boron Isotopesi*, ORNL-5418, Jun. 1978, pp. 1-79.
Excerpts from *Proceedings of the International Symposium on Isotope Separation* (Amsterdam, Apr. 23-27, 1957), ed. Kistemaker et al., Chap. 11-14, pp. 178-209.
Merriman, J. R., J. H. Pashley, N. W. Snow, *Engineering-Scale Studies of Boron Isotope Separation*, Report No. K-1653 from Union Carbide Corporation, Nuclear Division; 1966, pp. 1-124.

*Primary Examiner*—Donald P. Walsh
*Assistant Examiner*—Meena Chelliah

[57] ABSTRACT

The isotopes of boron, $^{10}B$ and $^{11}B$, are separated by means of a gas-liquid chemical exchange reaction involving the isotopic equilibrium between gaseous $BF_3$ and a liquid $BF_3$. donor molecular addition complex formed between $BF_3$ gas and a donor chosen from the group consisting of: nitromethane, acetone, methyl isobutyl ketone, or diisobutyl ketone.

3 Claims, 1 Drawing Sheet

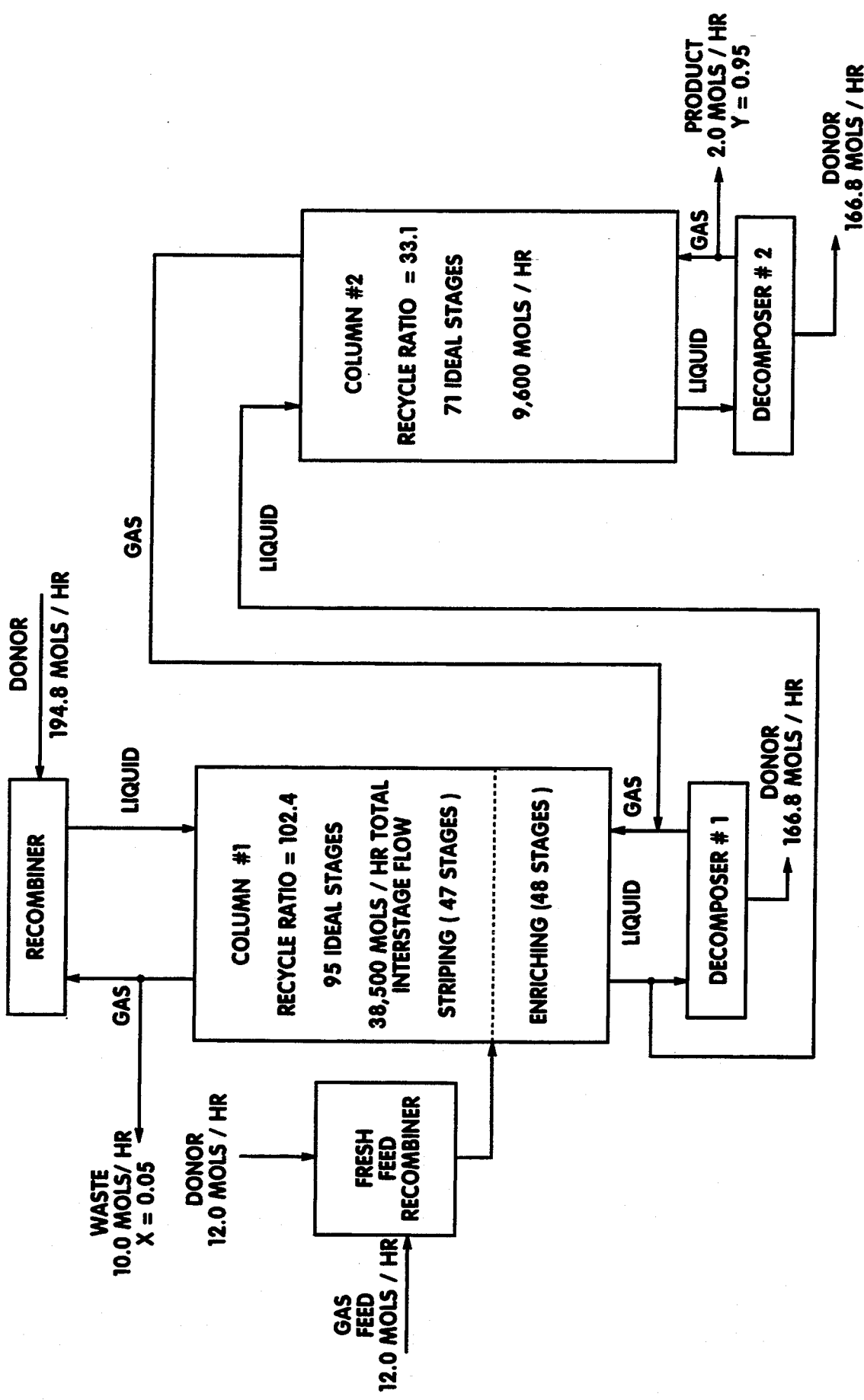

SEPARATION OF THE ISOTOPES OF BORON BY CHEMICAL EXCHANGE REACTIONS

GOVERNMENT RIGHTS

The U.S. Government has certain rights in this invention. This invention was made with Government support under subcontract C85 110754 awarded under prime contract No. DE-AC07-76ID01570 by the United States Department of Energy.

FIELD OF THE INVENTIONS

This invention relates to a method for separating the two isotopes of boron using specific chemical compounds as the donor material in gas/liquid chemical exchange reactions between $BF_3$ gas and the $BF_3$ donor molecular addition compound.

DESCRIPTION OF PRIOR ART

The impetus for the isotopic fractionation of boron arises primarily from a contrasting difference in thermal neutron capture cross sections. Boron-10 has a thermal neutron capture cross section of 3837 barnes, while that of $^{11}B$ is only 0.005 barnes. As a composite of the two isotopes, naturally occurring boron has a thermal neutron capture cross section of approximately 750 barnes. Subsequently, $^{10}B$ is roughly 5 times more effective than naturally occurring boron, 20 times more effective than lead, and nearly 500 times more effective than concrete as a neutron shielding material. It is precisely this propensity for thermal neutron capture which makes $^{10}B$ enriched materials a useful commodity, predominately in the nuclear-related industries.

The quest for a suitable method for the large scale separation of boron isotopes began in 1943. Research was initiated at Columbia University under a classified program of the Manhattan Project to develop a suitable scheme for the separation of boron isotopes. Six different separation schemes were investigated during the initial stages of the project. These were: (1) thermal diffusion of boron trifluoride; (2) distillation of the boron trifluoride; (3) distillation of methyl borate; (4) steam distillation of boric acid; (5) isotope exchange between the liquid dimethyl ether.$BF_3$; and (6) isotope exchange between ethyl borate.$BF_3$ complex and $BF_3$ gas.

Isotope exchange between $BF_3$ and the dimethyl ether . $BF_3$ complex was selected as the most efficient method of separation, primarily due to a lower rate of irreversible chemical decomposition. As a result of this work, Standard Oil Company (Indiana) designed and operated the first large-scale boron isotope fractionating facility, That plant was subsequently dismantled in 1948. A second, larger facility was constructed and operated by Hooker Electrochemical Corp. from 1953 to 1958 at Model City, N.Y. That plant successfully produced several hundred kilograms of 90–95% 10-B metal utilizing chemical exchange of dimethyl ether .$BF_3$ complex.

Another process relies on a gas-liquid partitioning process to fractionate the isotopes of boron. Two new separation cascades are employed. These cascades are identical, each consisting of two packed columns in series. The first column is 50.8 cm ID with a packed height of 42 meters, while the second is 30.5 cm ID with 27.4 meters of packing. The operating pressure throughout the system is 27 kPa (200 torr) with boilup at 96° C. Fourteen days are required from startup for the process to reach steady state operation.

Problems associated with the process used at the Quapaw plant include irreversible decomposition of the dimethyl ether-$BF_3$ complex to form undesired reaction products, and quantitative recovery of $BF_3$ from the complex is difficult. Furthermore, the equilibrium constant for this system is $K_{eq}=1.027$ at 30° C. The actual separation factor observed for the reported process is $\alpha=1.014$, with the reduction due primarily to incomplete dissociation of the complex in the vapor phase and solubility of $BF_3$ in the liquid complex.

A second drawback associated with the dimethyl ether system results from irreversible decomposition of the complex, At atmospheric pressure, roughly 50% of the dimethyl ether-$BF_3$ complex is decomposed to methyl fluoride and methyl borate in 24 hours. In order to decrease the decomposition rate to tolerable levels, the process is operated at subatmospheric pressure of approximately 200 torr.

SUMMARY OF THE INVENTION

The objective of this invention is to identify new and suitable donor species in chemical exchange reactions which will increase the equilibrium constant, and therefore the single stage separation factor, $\alpha$, for the boron isotopes in the appropriate multistage separation process. It is a further objective of this invention to identify appropriate chemical compounds which form stable molecular addition compounds (complexes) with boron trifluoride gas.

The objectives of this invention are provided by utilization of one of the following materials as donor species in the chemical exchange reaction between $BF_3$ gas and the liquid $BF_3$.donor molecular addition compound in the appropriate process equipment: nitromethane, acetone (methyl ketone), methyl isobutyl ketone (MIBK), or diisobutyl ketone (DIBK).

BRIEF DESCRIPTION OF FIGURE

The FIGURE is a schematic depiction of the separation process of the present invention.

DETAILED DESCRIPTION OF THE INVENTION

Isotope exchange processes are characterized by reactions of the type:

$$^{10}BX_{3(g)} + {}^{11}BX_3.Donor_{(l)} \rightleftharpoons {}^{11}BX_{3(g)} + {}^{10}BX_3.Donor_{(l)} \quad (1)$$

where X is generally H, $CH_3$ or a halogen. The "complex," $BX_3$.Donor, is a molecular addition compound, and Donor is a Lewis base or electron pair donor. The ideal single stage separation factor for reaction (1) is given by:

$$\alpha = \frac{[^{11}BX_{3(g)}][^{10}BX_3 \cdot Donor_{(l)}]}{[^{10}BX_{3(g)}][^{11}BX_3 \cdot Donor_{(l)}]} = \frac{[^{10}B/^{11}B]_{(l)}}{[^{10}B/^{11}B]_{(g)}} \quad (2)$$

where square brackets represent the equilibrium concentrations of the respective species.

Most known exchange systems pertinent to boron isotopes have values of the separation factor in the range of $1 \leq \alpha < 1.06$. That the equilibrium lies slightly to the right in reaction (1) forms the basis for the separation. The small value of $\alpha$ suggests the need of a multistage exchange process in order to obtain a significant degree of separation.

Utilization of the isotopic exchange reaction requires the passage of gaseous BX$_3$ and liquid complex in a stagewise process. Thus, $^{10}$B concentrates in the liquid phase while $^{11}$B concentrates in the gaseous phase. Pertinent considerations focus primarily on the selection of X and the donor molecule in reaction (1). These considerations include:

(a) The largest possible value of the separation factor, $\alpha$, in order to minimize the necessary number of stages for a given enrichment.

(b) The equilibrium must be rapidly established, e.g., isotopic exchange need be kinetically rapid in order to maintain a high throughput in a continuous system.

(c) BX$_3$ must be readily liberated from the complex for product recovery, recirculation and reuse of the separative agent or donor. In this regard, it is desirable that the formation reaction:

be quantitatively reversible simply by addition or removal of heat.

(d) The BX$_3$.Donor complex must be sufficiently stable so as not to decompose into unwanted reaction products. Such irreversible decomposition would result in $^{10}$B enriched product losses with the attendant loss of BX$_3$ and donor.

Virtually all systems studied to date have used the first member of the halogen family, fluorine, for X in the isotopic exchange reaction. This consideration largely stems from criteria (a) and (d) above and is associated with the excellent electron acceptor capabilities of BF$_3$. Use of BF$_3$ as the Lewis acid in the isotope exchange reaction has been justified on theoretical grounds as well. Consequently, the isotope exchange reaction may be rewritten for subsequent discussions as:

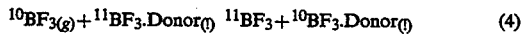

The species BF$_3$.Donor in equation (4) is an adduct formed between BF$_3$ and an electron pair donor. This type of compound formation is a classical example of Lewis acid-base chemistry. Here, the Lewis acid, BF$_3$, accepts a lone electron paid from the basic donor atom which is typically bound in a molecular species.

Certain chemical compounds selected from the group consisting of nitromethane, acetone, methyl isobutyl ketone (MIBK), or diisobutyl ketone (DIBK) will substantially enhance the separation factor over that obtained with dimethyl ether when one of these materials is used as the donor species in the isotope exchange reaction. The molecular addition compound formed between BF$_3$ gas and each of the above materials is quite stable with regard to irreversible decomposition.

Certain physical properties of the various BF$_3$.donor compounds are of interest. For example, the freezing point of the liquid complex fixes the lower temperature at which the gas-liquid equilibrium could be measured and determines the operating temperature of process scale fractionation facilities. It is also of practical interest to know the molar ratio BF$_3$ absorbed per mole of donor species. This determines the amount of material necessary to form the respective BF$_3$.donor complexes. These properties are summarized in Table 1.

TABLE 1

Selected Physical Properties and Description of the BF$_3$.Donor Complexes

| Donor | Freezing Point | Moles BF$_3$ Absorbed Per Mole of Donor |
|---|---|---|
| Nitromethane | −46° C. to −48° C. | 1.4 to 1.6 |
| Acetone | 16° C. to 18° C. | 1.0 to 1.2 |
| MIBK | 16° C. to 18° C. | 1.0 to 1.2 |
| DIBK | 16° C. to 18° C. | 1.0 to 1.2 |

The ideal single stage separation factors were measured experimentally under equilibrium conditions for each of the four donor species. A small amount of the pure liquid donor, typically 55 to 70 ml., was sealed in an equilibrium cell designed specifically for determining isotopic equilibrium between the gaseous and liquid phases. Gaseous BF$_3$ was then added to the system until complex formation was complete, as indicated by monitoring the internal pressure of the cell. Typically, enough excess BF$_3$ was added to increase the internal cell pressure by about 1 atm (14 psig) and ensure sufficient gas was available for the isotopic equilibrium. The temperature of the cell and contents was adjusted and maintained at a constant predetermined value by use of a constant temperature bath. Once the two phases had sufficient time to reach the isotopic equilibrium specified in equation (1), samples of the gaseous BF$_3$ and the liquid BF$_3$.donor phases were taken. All isotopic analyses were performed with a mass spectrometer and the isotopic ratios of boron in each of the two phases were determined. With the boron isotopic ratio [$^{10}$B/$^{11}$B] known for the gas and liquid phases, the separation factor was readily calculated in accord with the equation (2). This process was typically repeated several times for a given temperature. The temperature was then changed, the phases allowed to reequilibrate, and the sampling process repeated. In this manner, the separation factor, $\alpha$, was determined as a function of temperature for each of the BF$_3$/donor systems examined.

Tables 2 through 5 indicate separation factor as a function of temperature obtained experimentally for the different BF$_3$.donor systems examined. Reported values of $\alpha$ for the BF$_3$.dimethyl ether system are also indicated for comparative purposes. Note that for any given temperature, the separation factors associated with each of the BF$_3$.donor systems are substantially higher than that associated with the dimethyl ether system. The benefits of increasing the separation factor include the potential to substantially reduce the size of the necessary process equipment associated with large scale fractionation of boron isotopes. The best fit linear equation relating the natural logarithm of separation factor, ln $\alpha$, to temperature (Kelvin scale) are also indicated for each of the donor systems. These equations were obtained by linear regression of the experimental data presented in each table.

TABLE 2

Experimental Results In the Isotopic Exchange Reaction (4) Between BF$_3$ and the BF$_3$.Nitromethane System

| Temperature | Separation Factors, $\alpha$ | Average $\alpha$ | Reported $\alpha$ BF$_3$. Dimethyl Ether |
|---|---|---|---|
| 0° C. (273K) | 1.075 | 1.081 ± 0.004 | 1.034 |
| | 1.079 | | |
| | 1.085 | | |
| | 1.085 | | |
| | 1.082 | | |
| 15° C. (288K) | 1.075 | 1.074 ± 0.006 | 1.030 |
| | 1.079 | | |

TABLE 2-continued

Experimental Results In the Isotopic Exchange Reaction (4) Between BF$_3$ and the BF$_3$.Nitromethane System

| Temperature | Separation Factors, $\alpha$ | Average $\alpha$ | Reported $\alpha$ BF$_3$. Dimethyl Ether |
|---|---|---|---|
|  | 1.067 |  |  |
| 30° C. (303K) | 1.064 | 1.066 ± 0.002 | 1.027 |
|  | 1.066 |  |  |
|  | 1.066 |  |  |

Best fit linear equation through the above BF$_3$.nitromethane experimental data:

$$\ln \alpha = \frac{38.45}{T(K)} - 0.0627$$

TABLE 3

Experimental Results in the Isotopic Exchange Reaction (4) Between BF$_3$ and the BF$_3$.Acetone System

| Temperature | Separation Factors, $\alpha$ | Average $\alpha$ | Reported $\alpha$ BF$_3$.dimethyl Ether |
|---|---|---|---|
| 25° C. (298K) | 1.044 | 1.041 ± 0.003 | 1.028 |
|  | 1.038 |  |  |
|  | 1.042 |  |  |
| 35° C. (308K) | 1.033 | — | 1.027 |
| 45° C. (318K) | 1.030 | 1.028 ± 0.002 | 1.024 |
|  | 1.027 |  |  |
|  | 1.028 |  |  |

Best fit linear equation through the above BF$_3$.acetone experimental data:

$$\ln \alpha = \frac{59.58}{T(K)} - 0.1597$$

TABLE 4

Experimental Results in the Isotopic Exchange Reaction (4) Between BF$_3$ and the BF$_3$.MIBK System

| Temperature | Separation Factors, $\alpha$ | Average $\alpha$ | Reported $\alpha$ BF$_3$. Dimethyl Ether |
|---|---|---|---|
| 25° C. (298K) | 1.030 | 1.041 ± 0.005 | 1.028 |
|  | 1.040 |  |  |
|  | 1.044 |  |  |
|  | 1.043 |  |  |
|  | 1.041 |  |  |
|  | 1.042 |  |  |
|  | 1.044 |  |  |
| 35° C. (308K) | 1.029 | 1.036 ± 0.007 | 1.027 |
|  | 1.041 |  |  |
|  | 1.043 |  |  |
|  | 1.031 |  |  |
| 45° C. (318K) | 1.045 | 1.039 ± 0.004 | 1.024 |
|  | 1.038 |  |  |
|  | 1.034 |  |  |
|  | 1.037 |  |  |
|  | 1.041 |  |  |
|  | 1.040 |  |  |

Best fit linear equation through the above BF$_3$.MIBK experimental data:

$$\ln \alpha = \frac{9.504}{T(K)} - 0.0071$$

TABLE 5

Experimental Results in the Isotopic Exchange Reaction (4) Between BF$_3$ and the BF$_3$.DIBK System

| Temperature | Separation Factors, $\alpha$ | Average $\alpha$ | Reported $\alpha$ BF$_3$. Dimethyl Ether |
|---|---|---|---|
| 25° C. (298K) | 1.047 | 1.045 ± 0.002 | 1.028 |
|  | 1.045 |  |  |
|  | 1.044 |  |  |
| 35° C. (308K) | 1.043 | 1.042 ± 0.002 | 1.027 |
|  | 1.042 |  |  |
|  | 1.040 |  |  |
| 45° C. (318K) | 1.044 | 1.038 ± 0.004 | 1.024 |
|  | 1.038 |  |  |
|  | 1.033 |  |  |

Best fit linear equation through the above BF$_3$.DIBK experimental data:

$$\ln \alpha = \frac{31.758}{T(K)} - 0.0625$$

The Usefulness of the Invention

The benefits of increasing the separation factor in large scale isotope fractionation is easily brought into perspective with a simple comparison based on the familiar Fenske-Underwood equation:

$$n = \frac{\ln[y_p(1 - x_\omega)/y_p(1 - x_p)x_\omega]}{\ln \alpha} \quad (5)$$

Equation (5) provides the minimum number of ideal stages, n, required for a specified separation in an exchange column operated at total reflux. For a cascade producing 95% $^{10}$B product ($y_p$=0.95) and a 5% $^{10}$B waste stream ($x_\omega$=0.05), equation (5) can be simplified:

$$n = \frac{5.889}{\ln \alpha} \quad (6)$$

Minimum stage requirements are listed in Table 6 for the dimethyl ether, acetone, MIBK, DIBK and nitromethane systems based on reported values of the separation factor and evaluated from equation (6). It is apparent that a slight increase in separation factor results in a concomitant decrease in the minimum ideal stage requirements. Consequently, a dramatic reduction in the size of the required process equipment can be achieved if a ketone or nitromethane is used as the donor rather than dimethyl ether.

TABLE 6

Minimum Ideal Stage Requirements With Different Donors For A Boron Isotope Fractionation Cascade Operating at Total Reflux

| Donor | Separation Factor $\alpha$ | Min. n of Ideal Stages |
|---|---|---|
| Dimethyl ether | 1.014 | 424 |
| Acetone | 1.041 | 147 |
| MIBK | 1.041 | 147 |
| DIBK | 1.045 | 134 |
| Nitromethane | 1.081 | 77 |

The present invention can be further appreciated in light of the following detailed examples.

WORKING EXAMPLES

Example 1

Sixty-five milliliters of reagent grade acetone were sealed in the gas/liquid equilibrium cell. The cell was purged with ultra high purity helium and evacuated several times to remove residual air. After purging, the cell was pumped down to a pressure of 5 psig. Gaseous BF$_3$ was slowly added and the pressure monitored. Cell pressure remained constant while the acetone and BF$_3$ reacted, then increased as the complex formation reaction neared completion. Boron trifluoride addition was halted once a constant cell pressure of 15 psig was achieved. Consequently, a sufficient amount of BF₃ was added to react entirely with the acetone, plus an excess sufficient to increase the internal cell pressure by ΔP=10 psig. The cell and contents were allowed to equilibrate with continuous agitation at constant temperature. Small samples of the gas and liquid phases were removed from the cell for isotopic analysis on a mass spectrometer. All samples were taken at 10 to 24 hours intervals to ensure isotopic equilibrium had been achieved. Experimental results are shown in Table 7. Note that the separation factors were calculated directly from the isotopic ratios in accord with equation (2).

TABLE 7

Experimental Results for the BF₃·Acetone System

| Temperature | $[^{10}B/^{11}B]_{[l]}$ | $[^{10}B/^{11}B]_{(g)}$ | $\alpha = \dfrac{[^{10}B/^{11}B]_{[l]}}{[^{10}B/^{11}B]_{(g)}}$ |
|---|---|---|---|
| 25° C. (298K) | 0.2457 ± 0.0004 | 0.2353 ± 0.0015 | 1.044 |
|  | 0.2455 ± 0.0006 | 0.2364 ± 0.0015 | 1.038 |
|  | 0.2454 ± 0.0008 | 0.2356 ± 0.0008 | 1.042 |
| 35° C. (308K) | 0.2450 ± 0.0004 | 0.2372 ± 0.0021 | 1.033 |
| 45° C. (318K) | 0.2454 ± 0.0009 | 0.2382 ± 0.0004 | 1.030 |
|  | 0.2461 ± 0.0012 | 0.2397 ± 0.0004 | 1.027 |
|  | 0.2459 ± 0.0014 | 0.2393 ± 0.0004 | 1.028 |

Example 2

Fifty-five milliliters of reagent grade MIBK were sealed in the gas/liquid equilibrium cell. The cell was purged with ultra high purity helium and evacuated several times to remove residual air. After purging, the cell was pumped down to a pressure of −10 psig. Gaseous BF₃ was slowly added and the pressure monitored. Cell pressure remained constant while the MIBK and BF₃ reacted, then increased as the complex formation reaction neared completion. Boron trifluoride addition was halted once a constant cell pressure of 3 psig was achieved. Consequently, a sufficient amount of BF₃ was added to react entirely with the MIBK, plus an excess sufficient to increase the internal cell pressure by ΔP=13 psig. The cell and contents were allowed to equilibrate with continuous agitation at constant temperature. Small samples of the gas and liquid phases were removed from the cell for isotopic analysis on a mass spectrometer. All samples were taken at 10 to 24 hours intervals to ensure isotopic equilibrium had been achieved. Experimental results are shown in Table 8. Note that the separation factors were calculated directly from the isotopic ratios in accord with equation (2).

TABLE 8

Experimental Results for the BF₃·MIBK System

| Temperature | $[^{10}B/^{11}B]_{[l]}$ | $[^{10}B/^{11}B]_{(g)}$ | $\alpha = \dfrac{[^{10}B/^{11}B]_{[l]}}{[^{10}B/^{11}B]_{(g)}}$ |
|---|---|---|---|
| 25° C. (298K) | 0.2450 | 0.2378 | 1.030 |
|  | 0.2470 | 0.2375 | 1.040 |
|  | 0.2463 | 0.2359 | 1.044 |
|  | 0.2468 | 0.2367 | 1.043 |
| 35° C. (308K) | 0.2452 | 0.2383 | 1.029 |
|  | 0.2470 | 0.2373 | 1.041 |
|  | 0.2469 | 0.2367 | 1.043 |
|  | 0.2450 | 0.2375 | 1.031 |
| 45° C. (318K) | 0.2463 | 0.2358 | 1.045 |
|  | 0.2465 | 0.2375 | 1.038 |
|  | 0.2460 | 0.2378 | 1.034 |

Example 3

In a second BF₃/MIBK experiment, 58 ml of reagent grade MIBK was sealed in the gas/liquid equilibrium cell. The cell was purged with ultra high purity helium and evacuated several times to remove residual air. After purging, the cell was pumped down to a pressure −3 psig. Gaseous BF₃ was slowly added and the pressure monitored. Cell pressure remained constant while the MIBK and BF₃ reacted, then increased as the complex formation reaction neared completion. Boron trifluoride addition was halted once a constant cell pressure of 11 psig was achieved. Consequently, a sufficient amount of BF₃ was added to react entirely with the MIBK, plus an excess sufficient to increase the internal cell pressure by ΔP=14 psig. The cell and contents were allowed to equilibrate with continuous agitation at constant temperature. Small samples of the gas and liquid phases were removed from the cell for isotopic analysis on a mass spectrometer. All samples were taken at 10 to 24 hours intervals to ensure isotopic equilibrium had been achieved. Experimental results are shown in Table 9. Note that the separation factors were calculated directly from the isotopic ratios in accord with equation (2). The results of the second BF₃ · MIBK experiment indicate excellent agreement when compared to results in the previous example. Note that the separation factors reported in Table 4 are the combined results of the experiments described in Examples 2 and 3.

TABLE 9

Results of the Second Experiment With the BF₃·MIBK System

| Temperature | $[^{10}B/^{11}B]_{[l]}$ | $[^{10}B/^{11}B]_{(g)}$ | $\alpha = \dfrac{[^{10}B/^{11}B]_{[l]}}{[^{10}B/^{11}B]_{(g)}}$ |
|---|---|---|---|
| 25° C. (298K) | 0.2460 | 0.2373 | 1.037 |
|  | 0.2486 | 0.2387 | 1.041 |
|  | 0.2476 | 0.2380 | 1.040 |
| 45° C. (318K) | 0.2486 | 0.2388 | 1.041 |
|  | 0.2475 | 0.2375 | 1.042 |
|  | 0.2479 | 0.2375 | 1.044 |

Example 4

Sixty-three milliliters of reagent grade DIBK were sealed in the gas/liquid equilibrium cell. The cell was purged with ultra high purity helium and evacuated several times to remove residual air. After purging, the cell was pumped down to a pressure of −2 psig. Gaseous BF₃ was slowly added to the cell and the pressure monitored. Cell pressure remained constant while the DIBK and BF₃ reacted, then increased as the complex formation reaction neared completion. Boron trifluoride addition was halted once a constant cell pressure of 14 psig was achieved. Consequently, a sufficient amount of BF₃ was added to react entirely with the DIBK plus an excess sufficient to increase the internal cell pressure by ΔP=13 psig. The cell and contents were allowed to equilibrate with continuous agitation at constant temperature. Small samples of the gas and liquid phases were removed from the cell for isotopic analysis on a mass spectrometer. All samples were taken at 10 to 24 hour intervals to ensure isotopic equilibrium had been achieved. Experimental results are shown in Table 10. The separation factors were calculated directly from the isotopic ratios in accord with equation (2).

TABLE 10

Experimental Results for the BF₃.DIBK System

| Temperature | $[^{10}B/^{11}B]_{[l]}$ | $[^{10}B/^{11}B]_{(g)}$ | $\alpha = \dfrac{[^{10}B/^{11}B]_{[l]}}{[^{10}B/^{11}B]_{(g)}}$ |
|---|---|---|---|
| 25° C. (298K) | 0.2466 | 0.2355 | 1.047 |
|  | 0.2485 | 0.2377 | 1.045 |
|  | 0.2485 | 0.2380 | 1.044 |
| 35° C. (308K) | 0.2483 | 0.2381 | 1.043 |
|  | 0.2504 | 0.2403 | 1.042 |
|  | 0.2492 | 0.2396 | 1.040 |
| 45° C. (318K) | 0.2480 | 0.2375 | 1.044 |
|  | 0.2477 | 0.2386 | 1.038 |
|  | 0.2487 | 0.2408 | 1.033 |

Example 5

Seventy milliliters of redistilled reagent grade nitromethane was sealed in the gas/liquid equilibrium cell. The cell was purged with ultra high purity helium and evacuated several times to remove residual air. After purging, the cell was pumped down to a pressure of −3 psig. Gaseous BF₃ was slowly added to the cell and the pressure monitored. Cell pressure remained constant while the nitromethane and BF₃ reacted, then increased as the complex formation reaction neared completion. Boron trifluoride addition was halted once a constant cell pressure of 11 psig was achieved. Consequently, a sufficient amount of BF₃ was added to react entirely with the nitromethane plus an excess sufficient to increase the cell internal pressure by $\Delta P=14$ psig. The cell and contents were allowed to equilibrate with continuous agitation at constant temperature. Small samples of the gas and liquid phases were removed from the cell for isotopic analysis on a mass spectrometer. All samples were taken at 10 to 24 hour intervals to ensure isotopic equilibrium had been achieved. Experimental results are shown in Table 11. The separation factors were calculated from the isotopic ratios in accord with equation (2).

TABLE 11

Experimental Results for the BF₃.Nitromethane System

| Temperature | $[^{10}B/^{11}B]_{[l]}$ | $[^{10}B/^{11}B]_{(g)}$ | $\alpha = \dfrac{[^{10}B/^{11}B]_{[l]}}{[^{10}B/^{11}B]_{(g)}}$ |
|---|---|---|---|
| 25° C. (298K) | 0.2514 | 0.2339 | 1.075 |
|  | 0.2508 | 0.2325 | 1.079 |
|  | 0.2540 | 0.2341 | 1.085 |
|  | 0.2550 | 0.2350 | 1.085 |
|  | 0.2546 | 0.2354 | 1.082 |
| 35° C. (308K) | 0.2578 | 0.2389 | 1.075 |
|  | 0.2577 | 0.2389 | 1.079 |
|  | 0.2566 | 0.2406 | 1.067 |
| 45° C. (318K) | 0.2612 | 0.2446 | 1.068 |
|  | 0.2597 | 0.2441 | 1.064 |
|  | 0.2613 | 0.2451 | 1.066 |

Industrial scale application of this invention can readily be adapted to any equipment configuration suitable for gas-liquid contacting, for example, plate and tray columns or packed towers. An economical design would incorporate countercurrent flow of the liquid complex and BF₃ gas through one or more packed columns. The minimum number of ideal stages would be comparable to those listed in Table 6 (again, for the specified purity), provided the height equivalent to a theoretical plate (HETP) was known for a given packing, column diameter, and superficial flow rate.

The actual design of a large scale plant would depend on the desired production rates (throughput) and isotopic compositions (product purity). Regardless of these design parameters, the separation cascade must be operated at a suitable combination of temperature and pressure such that the BF₃.Donor complex and BF₃ remain in the liquid and gaseous states, respectively. From Table 1, separation equipment operating at atmospheric pressure would require operating temperatures greater than −45° C. for nitromethane, and roughly 20° C. for acetone, MIBK, or DIBK, thus ensuring the complexes remained in the liquid state. Tables 2 through 5 all indicate that the temperature should be kept as close to the freezing point of the complex as possible to maximize the separation factor.

The gaseous BF₃ would be liberated from the complex either thermally (temperature increase), by decreasing the pressure, or a combination of both. The BF₃. Donor complex would be reformed by cooling the reactants, increasing pressure, or a combination of both. Under these conditions, the donor would be recycled and continuously reused in the separation cascade.

A process flow schematic for the two square section cascade utilizing the nitromethane/BF₃ donor system is shown in FIG. 1. This process is based entirely on modeling and analysis results. Each column corresponds to a square section of the cascade and contains the appropriate number of identical ideal stages to perform the specified amount of separation for that section, The first section, denoted as column #1, contains the feed stage, a portion of the enriching section, and the entire stripping section. This is the largest of the two sections. A fraction of the isotopically depleted BF₃ gas is cut from the stream exiting the top of this column (corresponding to the stripping section) as the gaseous waste. The remainder of this gas stream is passed to a recombiner where it is reacted with an equimolar amount of the pure nitromethane donor to form the liquid complex. The nitromethane/BF₃ complex formed in the recombiner is returned to the top of the column as liquid recycle.

A fraction of the liquid complex exiting the bottom of the first section flows to a decomposer where it is completely dissociated (thermal reversal of the formation reaction) into equimolar amounts gaseous BF₃ and the liquid donor. The remainder of this stream forms the liquid feed to the top of column #2, the second square section. The BF₃ gas generated from the complex in decomposer #1 is combined with the gas stream exiting the top of the second column and returned to the bottom of the first column as gaseous recycle. The donor recovered from the decomposer would, if necessary, be purified in a separate system and stored for reuse in the recombiners.

The second square section, corresponding to column #2, is the smaller of the two columns and produces the final product of the specified composition. The entire liquid stream exiting the base of this section flows to decomposer #2 where it is thermally decomposed to gaseous BF₃ and nitromethane. The donor is reclaimed for reuse and a fraction of the gas stream exiting the decomposer is taken as the isotopically enriched BF₃ product. The remainder is returned to the bottom of column #2 as gaseous recycle.

Note that the total amount of donor exiting the decomposers is equivalent to the amount of nitromethane required in the recombiners. This is a result of assuming that the formation reaction is completely reversible; the donor is neither consumed nor replaced in the exchange system. Consequently, the donor is continuously recycled and reused in the separation system. In the event of irreversible decomposition of the nitromethane/$BF_3$ complex, the appropriate donor purification system would be incorporated into the actual plant design.

The first and largest column in the cascade includes the entire stripping section. Of the 95 ideal stages included in this column, 47 of these stages located above the feed stage in the upper portion of the column, form the stripping section. The balance, or 48 ideal stages, located from the bottom of the column up to and including the feed stage, are a portion of the enriching section. In accord with the previous discussions, the size of the stripping section could be reduced, or even eliminated entirely, depending on the desired waste composition. If stripping were completely eliminated, the first section would contain only 48 ideal stages with a total interstage flow rate of 19,900 mole/hr through the column. Therefore, even in the absence of stripping, column #1 would still be the largest in terms of total interstage flow. Note that the recycle ratio for this section of the cascade would be the same if the size of the stripping section were reduced or even eliminated. This is a consequence of the fact that the specified recycle ratio (1.45 times the minimum) is fixed by the feed and product compositions. This specified recycle ratio through the column also fixes the energy requirements to the cascade.

The total interstage flow through the individual columns is greatest in the first section or column, which includes the feed stage, a portion of the enriching section, and the entire stripping section, and smallest in the final, or product column. The total interstage flow through the two section squared-off cascade, as calculated, is 48,100 mols/hr. Of this, 38,500 mols/hr, or 80% of the total interstage flow, occurs in the first section. The balance—9,600 mols/hr, or roughly 20% of the total interstage flow through the system—occurs in the final (and smallest) section. This is a consequence of decreasing the recycle ratio in the different sections as the product end of the cascade is approached.

This has been a description of the present invention and what is believed to be the best mode of practicing that invention. However, the invention should only be defined by the appended claims wherein we claim:

1. A method for the fractionation of boron isotopes by means of the isotopic chemical exchange equilibrium reaction comprising countercurrent gas/liquid separation of a $BF_3$ . Donor complex, said $BF_3$ . Donor complex comprising $^{10}BF_3$ . Donor and $^{11}BF_3$ . Donor and collecting $^{10}BF_3$, wherein said Donor is selected from the group consisting of nitromethane, acetone, methyl isobutyl ketone, or diisobutyl ketone.

2. The method claimed in claim 1 wherein said Donor is nitromethane.

3. The method claimed in claim 2 wherein said countercurrent gas/liquid separation is conducted at atmospheric pressure.

* * * * *

UNITED STATES PATENT AND TRADEMARK OFFICE
CERTIFICATE OF CORRECTION

PATENT NO. : 5,419,887
DATED : May 30, 1996
INVENTOR(S) : Frank P. McCandless, Ronald S. Herbst It is certified that error appears in the above-indentified patent and that said Letters Patent is hereby corrected as shown below:

Column 1, line 5, insert the following:

--This invention was made with support under grant number EGG-C85-110754(DOE) awarded by the Department of Energy.--

Signed and Sealed this

Thirteenth Day of August, 1996

Attest:

BRUCE LEHMAN

Attesting Officer                Commissioner of Patents and Trademarks